(12) United States Patent
Shkondin

(10) Patent No.: US 6,975,054 B2
(45) Date of Patent: Dec. 13, 2005

(54) ELECTRIC MOTOR

(75) Inventor: Vasily Vasilievich Shkondin, Moscow (RU)

(73) Assignee: Ultra Motor Company Limited, Liverpool (GB)

(*) Notice: Subject to any disclaimer, the term of this patent is extended or adjusted under 35 U.S.C. 154(b) by 0 days.

(21) Appl. No.: 10/824,205

(22) Filed: Apr. 14, 2004

(65) Prior Publication Data

US 2004/0239204 A1 Dec. 2, 2004

Related U.S. Application Data

(63) Continuation of application No. PCT/RU03/00178, filed on Apr. 18, 2003.
(60) Provisional application No. 60/512,652, filed on Oct. 20, 2003.

(51) Int. Cl.[7] .................. H02K 23/04; H02K 23/00
(52) U.S. Cl. .................. 310/148; 310/127; 310/151; 310/154.01; 310/177; 310/195
(58) Field of Search ............... 310/127–131, 310/134, 136, 177, 219, 67 R, 148, 151, 195, 197–198, 203–205

(56) References Cited

U.S. PATENT DOCUMENTS

| | | |
|---|---|---|
| 4,190,779 A | 2/1980 | Schaeffer |
| 5,164,623 A | 11/1992 | Shkondin |
| 6,384,496 B1 | 5/2002 | Pyntikov et al. |
| 6,492,756 B1 | 12/2002 | Maslov et al. |
| 6,580,237 B2 * | 6/2003 | Harada et al. ............... 318/254 |
| 6,800,980 B2 * | 10/2004 | Kuenzel et al. ............. 310/234 |
| 6,819,025 B2 * | 11/2004 | Egawa et al. ................ 310/216 |

FOREIGN PATENT DOCUMENTS

| | | | |
|---|---|---|---|
| CA | 2072759 | 1/1992 | |
| EP | 0507967 | 5/1992 | ............ B60K/7/00 |
| GB | 2149226 | 6/1985 | .......... H02K/29/06 |
| RU | 2035115 | 5/1995 | .......... H02K/23/00 |
| RU | 2038985 | 7/1995 | .......... H02K/23/00 |
| SU | 628008 | 10/1978 | ............ B60K/7/00 |
| SU | 910480 | 3/1982 | ............ B60K/7/00 |
| SU | 1725780 | 4/1992 | |

* cited by examiner

Primary Examiner—Burton Mullins
(74) Attorney, Agent, or Firm—Garvey, Smith, Nehrbass & Doody, L.L.C.; Seth M. Nehrbass; Brett A. North

(57) ABSTRACT

An electric motor includes a stator which carries permanent magnets, and a rotor which carries electromagnets. A particular arrangement of connecting up the windings of the electromagnets to the distributing collector and the selection of the ratio of stator magnets to rotor electromagnets enable higher torque to be achieved. The main field of application is in motor-wheels of vehicles.

20 Claims, 3 Drawing Sheets

ELECTRIC MOTOR

CROSS-REFERENCE TO RELATED APPLICATIONS

Priority is hereby claimed to U.S. Application Ser. No. 60/512,652, filed 20 Oct. 2003.

Incorporated herein by reference is my U.S. Application Ser. No. 60/512,652, filed 20 Oct. 2003.

This is a continuation of International Application No. PCT/RU2003/00178, filed 18 Apr. 2003, priority of which is hereby claimed.

Incorporated herein by reference is my International Application No. PCT/RU2003/00178, filed 18 Apr. 2003.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

Technology Field

The invention relates to electric motors, primarily for vehicles, in the form of motor-wheels, and is intended for use in electrically propelled bicycles, wheelchairs, scooters, motorcycles, buses, and also winches, cranes, etc.

2. General Background of the Invention

Technology Level

Collector motor-wheels with no reduction gear, in which the rotation of the wheel is brought about directly by the electromagnetic interaction of magnetic stator-and-rotor system, are known (SU 628008 A, Oct. 15, 1978; SU 910480 A, Mar. 7, 1982; SU 1725780 A3, Apr. 7, 1992; U.S. Pat. No. 5,164,623 B1 Nov. 17, 1992, U.S. Pat. No. 6,492,756 B1, Dec. 10, 2002-all references mentioned herein are incorporated herein by reference).

The closest analogue to the proposed invention is an electric motor for a vehicle, containing a stator with an even number of permanent magnets located in a circle at uniform pitch, a rotor with electromagnets, a distributing collector having conducting plates round its circumference, combined in a set order into groups with positive and negative polarity, connected to a direct current supply and separated by dielectric gaps, and also brushes contacting the said collector, connected to the windings of the electromagnet coils (U.S. Pat. No. 6,384,496 B1, May 7, 2002). A significant fault of this motor is its low torque, which severely limits its field of practical application.

It should be noted that various technical solutions for increasing the torque of motor wheels are already known; however, they involve the use of high-voltage power supplies and complex control circuits, so that they are difficult to produce and not very reliable in use.

While certain novel features of this invention shown and described below are pointed out in the annexed claims, the invention is not intended to be limited to the details specified, since a person of ordinary skill in the relevant art will understand that various omissions, modifications, substitutions and changes in the forms and details of the device illustrated and in its operation may be made without departing in any way from the spirit of the present invention. No feature of the invention is critical or essential unless it is expressly stated as being "critical" or "essential."

BRIEF SUMMARY

An object is to improve the technical characteristics of an electric motor of the type under consideration, primarily to increase its torque.

Another object is to provide increased torque without significant complication of the design or use of the motor.

In a preferred embodiment it has been established experimentally by the author of the invention that a solution to this problem can be found by selecting a specific ratio, and corresponding disposition of the number of electromagnets in the stator, the permanent magnets in the rotor and the collector plates, and their position relative to each other, and also by a specific way of connecting the electromagnet coils to the supply.

In a preferred embodiment the coils of adjacent electromagnets in the rotor, are connected in pairs, in series aiding, and to the coils of a pair of diametrically opposite electromagnets, in series opposing; the leads of their windings, connected to the corresponding brushes, are shunted by capacitors, so that each two pairs of diametrically opposite electromagnets, together with the capacitor, form a resonant circuit. The number (n) of permanent magnets in the stator and the number (m) of the said resonant circuits are determined from the equations n=10+k, m=2+k, where k is a whole number (k=0,1,2,3 . . . ), the number of plates in the distributing collector is taken as equal to n, and the axial lines of the dielectric gaps in the distributing collector are aligned along the axial lines of the permanent magnets in the stator.

Such a relation of the number of electromagnets, permanent magnets and collector plates, and such an electromagnet commutation circuit containing capacitors, provides resonance of currents in the low frequency circuits formed by the pairs of diametrically opposite electromagnets and the capacitors connected to them. The rating of the capacitors should be coordinated with the number of coil windings shunted by these capacitors.

It was unexpectedly discovered that the resonance phenomena are amplified in the event of the number of loops in the coil windings electrically connected to each other (diametrically opposite electromagnets) differing from each other by an integral multiple.

In a preferred embodiment the ratio between the numbers of loops in the windings of the one and the other diametrically opposite electromagnets in each pair should be 1/32, 1/16, 1/8, or 1/4.

The rotor can be located outside or inside the stator.

The brushes may be able to be displaced round the circumference relative to the collector in order to adjust the commutation of the electromagnet coils. In a preferred embodiment of the present invention is an electric motor, containing:

a stator with a circular magnetic conductor, to which an even number of permanent magnets is attached at uniform pitch;

a rotor, separated from the stator by an air gap and carrying electromagnets interacting with the permanent magnets in the stator;

a distributing collector, fixed to the body of the stator and having current conducting plates round its circumference, connected at alternating polarity to a direct current supply and separated by dielectric gaps;

brushes, connected to the rotor, which are able to contact the collector plates and are connected to electromagnet coil windings, wherein the coil windings of adjacent electromagnets are connected in pairs in series aiding, and to the windings of the coils of a pair of diametrically opposite electromagnets in series opposing, with capacitors connected to the leads of the windings connected to the brushes to form resonant circuits, the number (n) of the permanent magnets of the stator and the number (m) of the resonant circuits being determined from the equations n=10+4k, m=2+k, where k is a whole number (k=0,1,2,3 . . . ), the number of plates in the distributing collector is equal to the number of magnets in the stator, and the axial lines of the dielectric gaps in the distributing collector are aligned along the axial lines of the permanent magnets of the stator. Preferably, the number of loops in the coil windings of diametrically opposite electromagnets is different, the difference being 1/32, 1/16, 1/8 or 1/4. Preferably, the rating of the capacitor connected to the electromagnet coil windings is proportional to the total number of loops in these windings. In one embodiment, the rotor is located outside the stator, although the rotor could be located inside the stator. Preferably, the brushes are able to be adjusted in position on the circumference relative to the collector.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION

Detailed descriptions of one or more preferred embodiments are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in any appropriate system, structure or manner.

Figure 1:
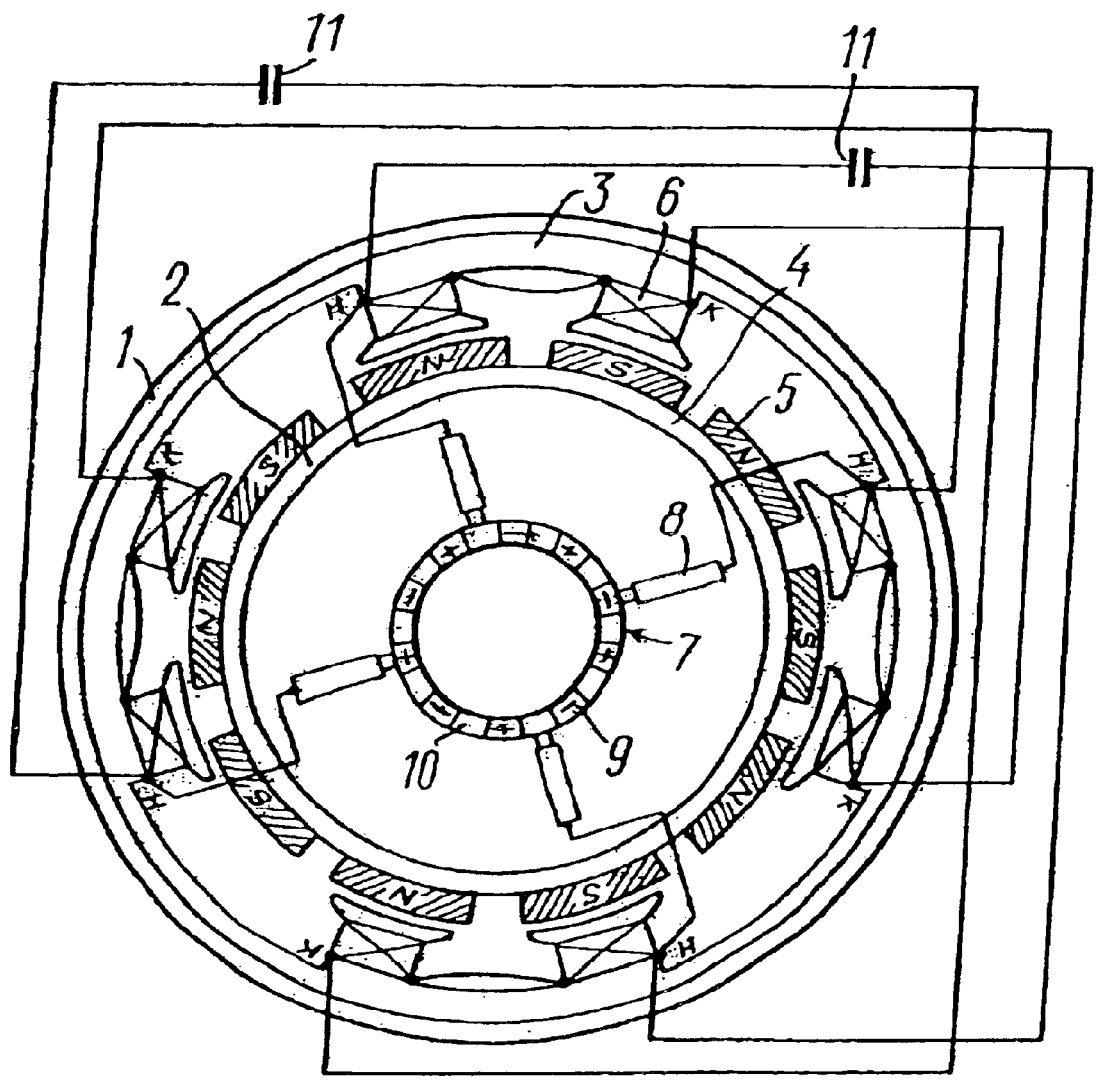
FIGS. 1 and 2 show a side view of an electric motor made in accordance with the invention for two possible versions: with an external rotor (FIG. 1) and an internal rotor (FIG. 2).
Figure 2:
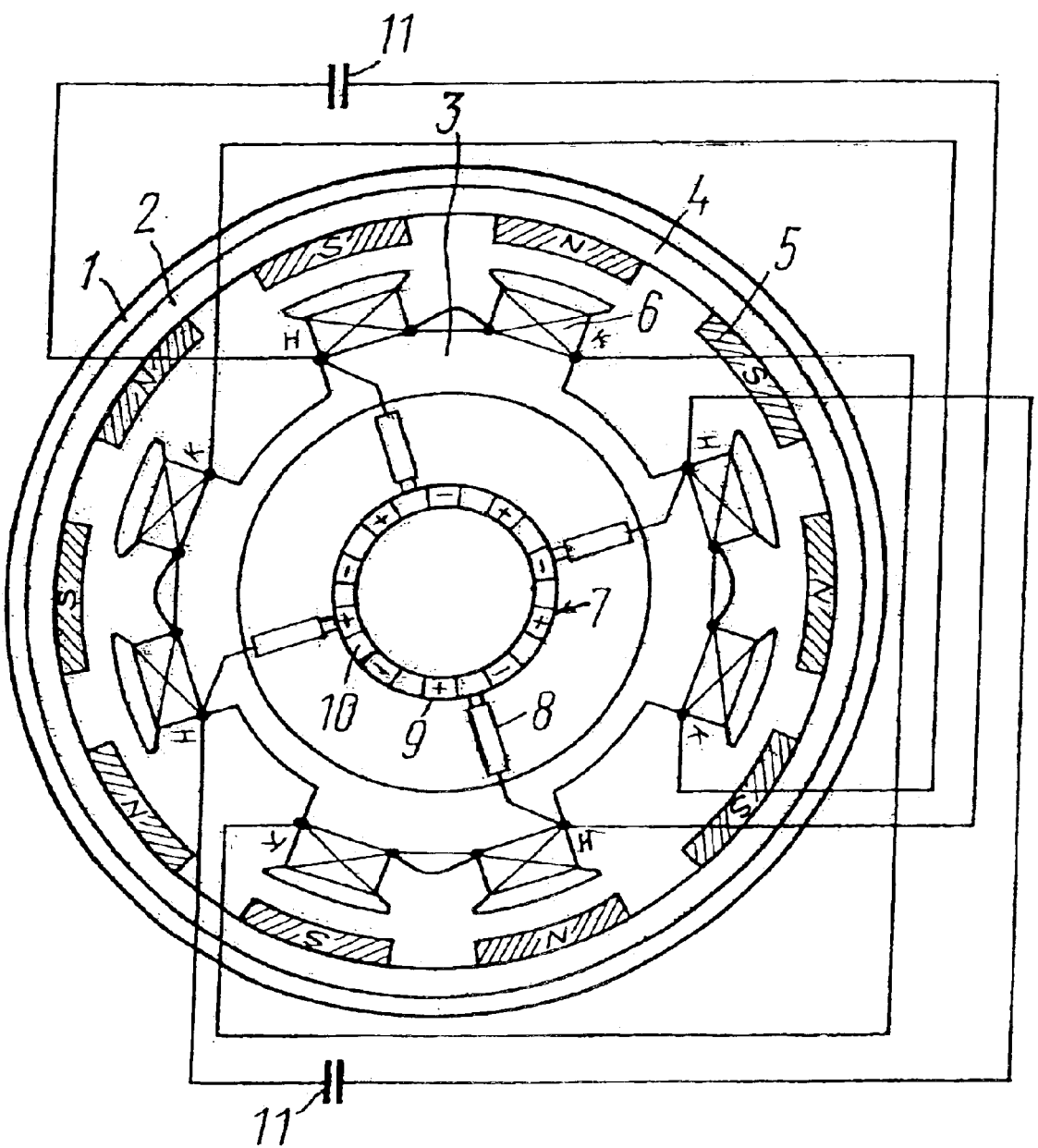

As is apparent from FIGS. 1 and 2, in a preferred embodiment the electric motor can contain a shell (1), serving as a casing, a stator (2) and a rotor (3). In FIG. 1 the rotor (3) is located outside the stator, and in FIG. 2, inside the stator. In the structure of the motor-wheel, the rotor can be connected to the rotated wheel (not shown) and a direct connection with no reduction gear is advisable. The electric motor stator (2) can have a cylindrical magnetic conductor (4), to which permanent magnets (5) of alternating polarity are fixed.

The electric motor rotor (3) can carry electromagnets (6), the coils of which, when the motor is running, receive direct current from a DC supply (not shown) via the collector distributor (7) and the brushes (8). The collector distributor (7) can be fixed, but the brushes (8) can be connected to the rotor, and as it rotates, they are displaced relative to the conducting plates (9) of the collector distributor. The said plates can be connected to the DC supply with alternating polarity and can be separated from each other by dielectric gaps (10).

The principle of operation of an electric motor made in accordance with this invention is no different from normal. The change of polarity of the rotor electromagnets as the brushes connected to them are displaced relative to the collector plates connected alternately to different poles of the DC supply, with the alternating polarity of the permanent magnets in the stator, creates an attraction of each electromagnet of the rotor to the magnet of the stator nearest to it in the direction of rotation of the rotor, and a repulsion from the preceding one.

The novelty of the electric motor made in accordance with this invention lies in the strictly determined ratio of the number of stator magnets, rotor electromagnets and conducting collector plates, and also in the manner in which the electromagnet coils are connected up. The coils of two adjacent electromagnets are connected to each other in series aiding (in FIGS. 1 and 2, this corresponds to the connection from the beginning of the winding, denoted by "H", to the end, denoted by "K"), but to the pair of coils of the electromagnets located diametrically opposite, in series opposing (from the end "K" to the beginning "N"); the ends of the windings not connected to each other (the "free" ends) are connected to the brushes (8) and are simultaneously shunted by capacitors (11) to form a resonant circuit.

The set number of permanent magnets in the stator must be compatible with the set number of pairs of such circuits. Thus, the variant of the motor in accordance with FIGS. 1 and 2 with two resonant circuits must have a stator with 10 permanent magnets and with precisely the same number of conducting plates (9) of the collector distributor. The overall relationship of the ratios of resonant circuits and number of permanent magnets is determined from the equations n=10+4k, m=2+k, where n is the number of magnets, m is the number of circuits and k is a whole number (k=0,1,2,3 . . . ). On the basis of these equations, for 14 stator magnets, there should be three resonant circuits, and so on.

Figure 3:
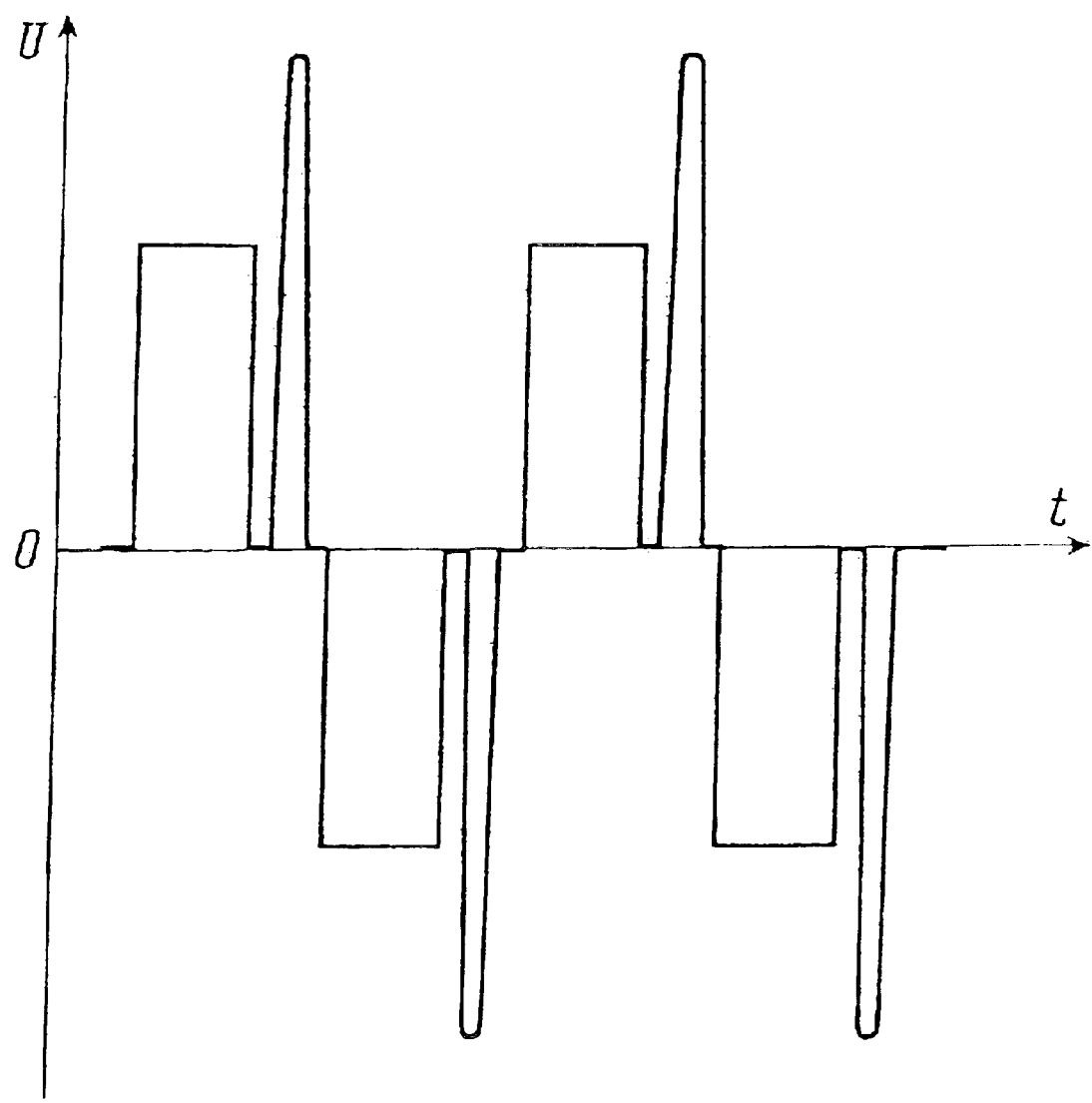
FIG. 3 shows a graph of the voltage in the leads of the electromagnet coils connected to each other, forming a resonant circuit with the capacitor connected to them.

The number of conducting plates of the collector distributor must be equal to the number of permanent magnets in the stator, and the axial lines of the dielectric gaps (10) between the plates must coincide with the axial lines of the permanent magnets. As can be seen from the voltage graph shown in FIG. 3, the way that each of the circuits is connected up in turn via the brushes connected to the rotor to the different-polarity collector plates as the rotor rotates creates alternating current in them, as a result of which current resonance occurs in the circuit, thus increasing the torque created by the motor. This effect is enhanced by the different number of loops in the coil windings.

The number of loops in the coils of the diametrically opposite electromagnets differs between them by 1/32, 1/16, 1/8 and in certain cases 1/4.

If, for example, in one of the pairs of series-wired coils, the number of loops is 128, the number in the second pair (diametrically opposite) must be 124, which is a ratio of 1/32, or 120 for a ratio of 1/16 and so on.

The rating of the capacitor (11) depends on the total inductance of the series-wired windings shunted thereby.

Industrial Applicability

Since the motor in accordance with the invention can achieve high torque for relatively low voltage supply rating, and is simple in design, it has a wide range of possible applications.

A prototype motor made in accordance with the invention, with the parameters:

| | |
|---|---|
| diameter - | 400 mm |
| weight - | 16 kg |
| power - | 5.5 kW |
| voltage - | 48 V | creates torque of up to 500 Nm. The motor has 22 permanent magnets in the stator and five resonant circuits. The electromagnet windings are calculated for the ratio 1/16.

All measurements disclosed herein are at standard temperature and pressure, at sea level on Earth, unless indicated otherwise.

It will be understood that each of the elements described above, or two or more together may also find a useful application in other types of methods differing from the type described above. Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention set forth in the appended claims. The foregoing embodiments are presented by way of example only; the scope of the present invention is to be limited only by the following claims.

What is claimed is:

1. An electric motor, comprising:
   (a) a stator having a circular magnetic conductor wherein an even number of permanent magnets are attached at a uniform pitch;
   (b) a rotor separated from the stator by an air gap and carrying a plurality of electromagnets interacting with the permanent magnets in the stator;
   (c) a distributing collector attached to the stator and having a plurality of current conductor plates located around the collector's circumference, the plurality of current conductor plates separated by dielectric gaps and further electrically connected at alternating polarity to a direct current supply;
   (d) a plurality of brushes attached to the rotor, at least two of the brushes electrically connected with at least two of the collector plates and each brush electrically connected to at least two of the electromagnet coil windings, wherein the coil windings of adjacent electromagnets are electrically connected in pairs and in series aiding, and the windings of the coils of a pair of diametrically opposite electromagnets in series opposing;
   (e) capacitors electrically connected to the leads of the electromagnet coil windings electrically connected to the brushes thereby forming a plurality of resonant circuits;
   (f) wherein the number (n) of the permanent magnets of the stator and the number (m) of the resonant circuits is determined from the equations n=10+4k, m=2+k, where k is a whole number; and
   (g) wherein the number of plates in the distributing collector is equal to the number of permanent magnets in the stator, and the axial lines of the dielectric gaps in the distributing collector are aligned along the axial lines of the permanent magnets of the stator.

2. The electric motor of claim 1, wherein the number of loops in the coil windings of diametrically opposite electromagnets is different, the difference being selected from set of ratios consisting of 1/32, 1/16, 1/8, and 1/4.

3. The electric motor of claim 2, wherein the rating of at least one of the capacitors electrically connected to the electromagnet coil windings is proportional to the total number of loops in these windings.

4. The electric motor of claim 3, wherein the rotor is located outside of the stator.

5. The electric motor of claim 3, wherein the rotor is located inside of the stator.

6. The electric motor of claim 3, wherein the brushes are adjustable relative to the collector plates.

7. The electric motor of claim 2, wherein the rotor is located outside of the stator.

8. The electric motor of claim 7, wherein the brushes are adjustable relative to the collector plates.

9. The electric motor of claim 2, wherein the rotor is located inside of the stator.

10. The electric motor of claim 9, wherein the brushes are adjustable relative to the collector plates.

11. The electric motor of claim 2, wherein the brushes are adjustable relative to the collector plates.

12. The electric motor of claim 1, wherein the rating of at least one of the capacitors electrically connected to the electromagnet coil windings is proportional to the total number of loops in these windings.

13. The electric motor of claim 12, wherein the rotor is located outside of the stator.

14. The electric motor of claim 12, wherein the rotor is located inside of the stator.

15. The electric motor of claim 12, wherein the brushes are adjustable relative to the collector plates.

16. The electric motor of claim 1, wherein the rotor is located outside of the stator.

17. The electric motor of claim 16, wherein the brushes are adjustable relative to the collector plates.

18. The electric motor of claim 1, wherein the rotor is located inside of the stator.

19. The electric motor of claim 18, wherein the brushes are adjustable relative to the collector plates.

20. The electric motor of claim 1, wherein the brushes are adjustable in a position on the circumference relative to the collector.

* * * * *